United States Patent [19]

Okano

[11] 4,086,478
[45] Apr. 25, 1978

[54] MARK POSITION DETECTING APPARATUS
[75] Inventor: Michiaki Okano, Kawasaki, Japan
[73] Assignee: Tokyo Shibaura Electric Co., Ltd., Kawasaki, Japan
[21] Appl. No.: 750,370
[22] Filed: Dec. 14, 1976
[30] Foreign Application Priority Data
Dec. 15, 1975 Japan ............................... 50-149326
[51] Int. Cl.² .............................................. G06K 7/10
[52] U.S. Cl. .................................................. 235/466
[58] Field of Search ................................ 235/61.11 E; 340/146.3 E, 146.3 Z; 250/566, 568, 569, 555

[56] References Cited
U.S. PATENT DOCUMENTS

| | | | |
|---|---|---|---|
| 3,792,236 | 2/1974 | Dobras et al. | 235/61.11 E |
| 3,892,949 | 7/1975 | Dodson | 235/61.11 E |
| 3,906,202 | 9/1975 | Meyer | 235/61.11 E |
| 3,961,160 | 6/1976 | Gorgens | 235/61.11 E |
| 3,993,893 | 11/1976 | Graf | 235/61.11 E |
| 3,995,146 | 11/1976 | Tetrev | 235/61.11 E |

Primary Examiner—Daryl W. Cook

Attorney, Agent, or Firm—Oblon, Fisher, Spivak, McClelland & Maier

[57] ABSTRACT

A mark position detecting apparatus including a pattern signal generating circuit, a presettable counter, a detector circuit, a first register, a memory device, a second register, a divider and a control signal generating circuit. The pattern signal generating circuit produces a pattern signal corresponding to a pattern region of a document to be delivered. Based on the pattern signal, the presettable counter counts clock pulses corresponding to the distance between first and second reference marks. The detector circuit detects a mark signal contained in the pattern signal corresponding to the mark and the first register stores the count data of the presettable counter. The memory device stores the number of mark columns in the pattern region and is coupled to the second register. The divider is connected to the first and second registers so as to divide the count data of the first register by that of the second register and produces data which shows the position of the column containing the mark.

9 Claims, 15 Drawing Figures

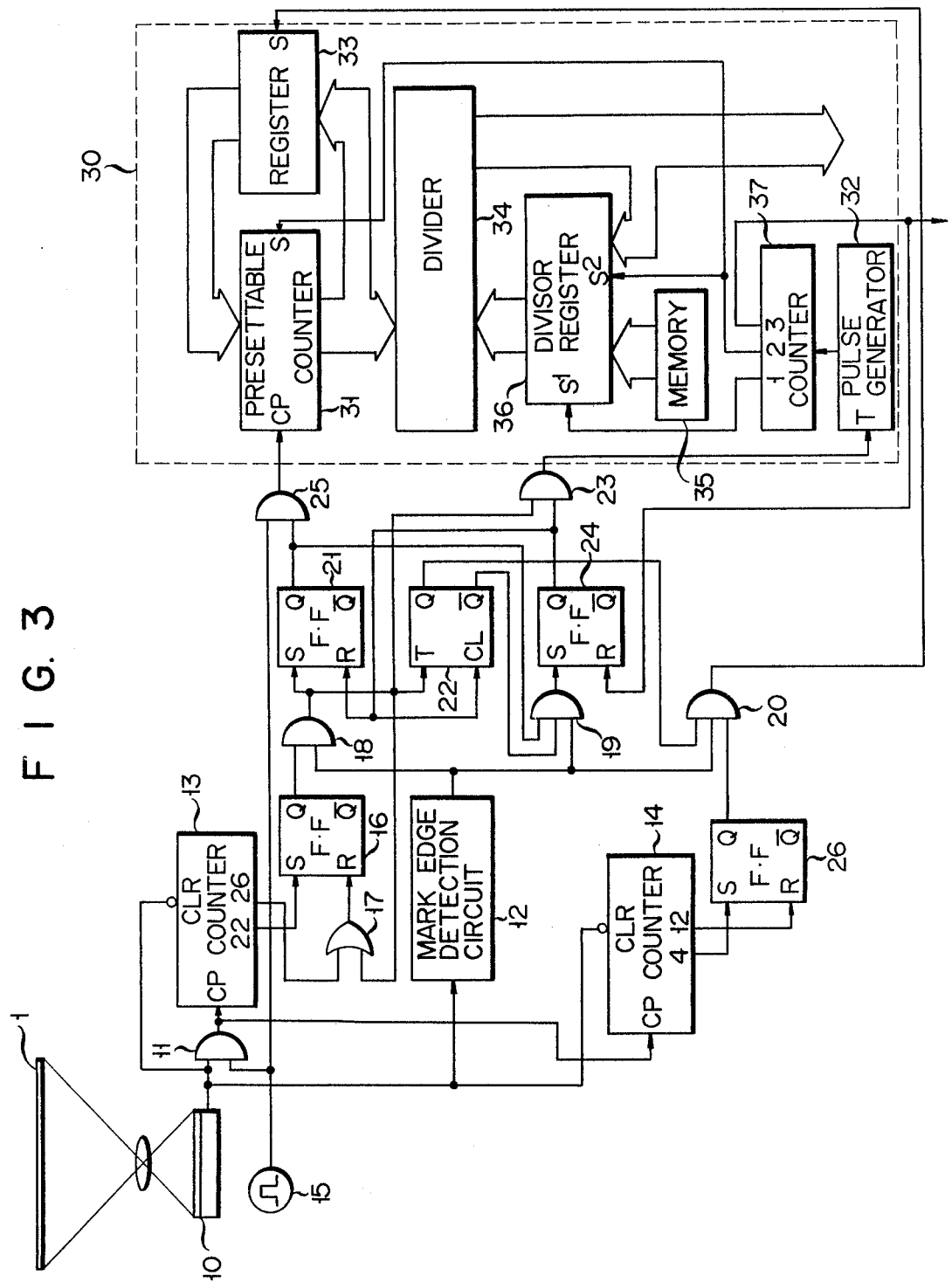
F I G. 3

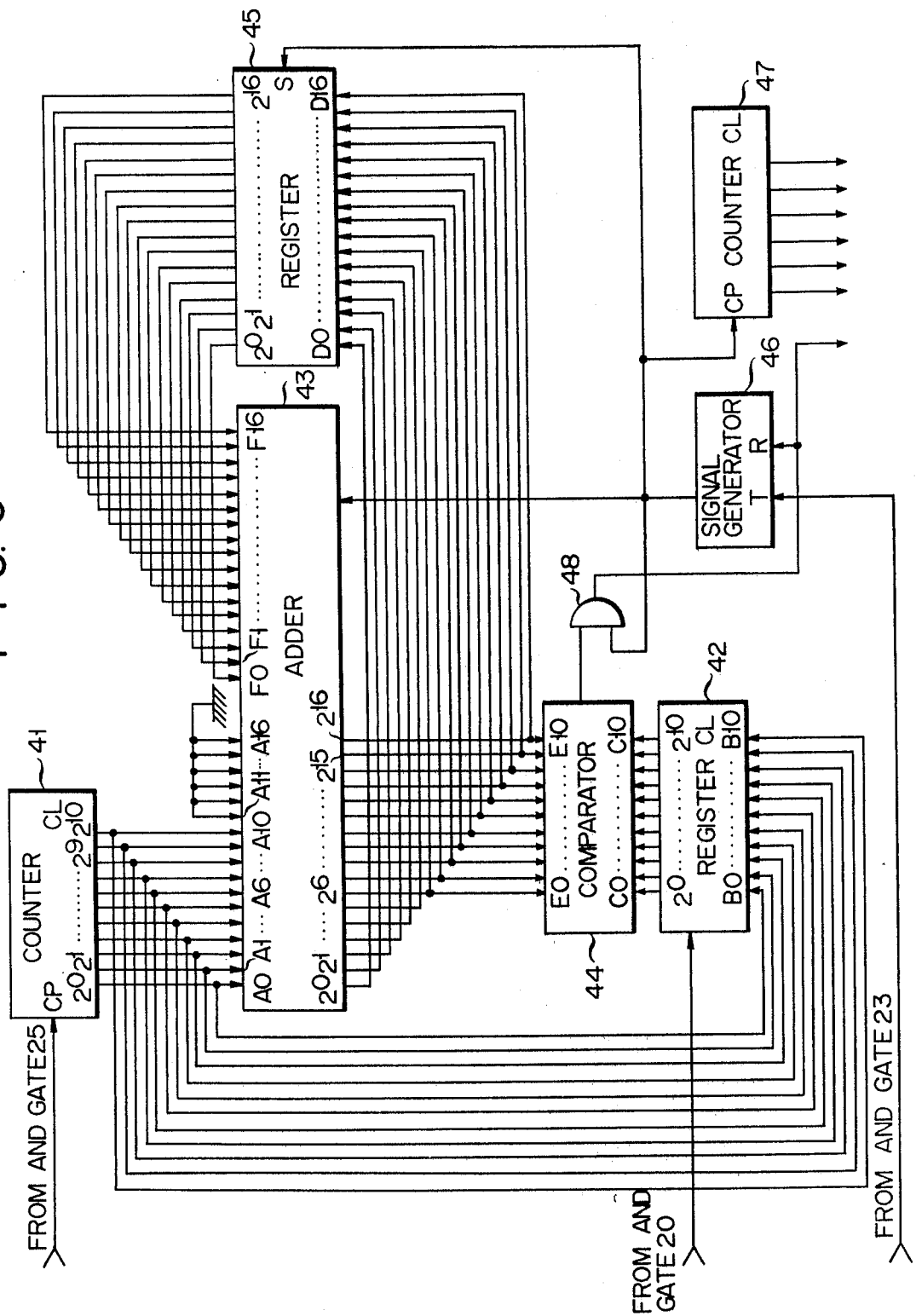

MARK POSITION DETECTING APPARATUS

BACKGROUND OF THE INVENTION

This invention relates to a mark position detecting apparatus for detecting the position of a mark written between two reference marks.

Conventionally, to effect an automatic facsimile transmission a document is provided at a prescribed place with a pattern region for designating the address or addresses to which a copy of document is to be transmitted. Generally, such a pattern region has one or more address marks which are bar codes or the like and is scanned by optical means. To obtain an electric signal corresponding to the pattern region a photo-electric converter is employed. In response to the electric signal, only the facsimile receiver or receivers which correspond to the address marks are set to receive the information from the transmission station.

FIG. 1 shows an example of a pattern region, which is positioned at the upper portion of document 1. This pattern region consists of two reference marks 2 and 3 of the same width and an address mark region 4 between the reference marks 2 and 3. The address mark region 4 is divided into address mark columns having the same width, the number of which is equal to or more than that of the necessary addresses. The address mark columns are separated from one another by, for example, dropout color lines. Any desired address mark column is at least partly painted out, for example, by hand to enter an address mark 5 in the address mark region 4.

To read out the marked address, the pattern region is scanned in the ordinary facsimile scanning direction. Then, a photo-electric converter generates such a pattern signal as shown in FIG. 2A, which indicates the position of the address mark 5 relative to the reference marks 2 and 3. In the meantime, a clock pulse generator produces such clock pulses of a specific frequency as shown in FIG. 2B. During the period of time between the trailing edge of a pulse corresponding to the first reference mark 2 and the leading edge of a pulse corresponding to the second reference mark 3, the pulses shown in FIG. 2B are supplied to a counter as shown in FIG. 2C. The count of the counter therefore corresponds to the position of the address mark 5, and is supplied as an address code to an automatic dialing device. As a result, the dialing device connects the desired facsimile receiver to the facsimile transmission station.

Such a conventional address designating system is applicable if about 20 and 30 address mark columns are provided on an A4-size original document so that each column may have a sufficient width of about 6 to 10 mm. But it cannot be applicable if the necessary address mark columns amount to 70 to 80. In this case the column width is as narrow as 2 to 3 mm, and it would occur that instead of a marked address mark column an unmarked one be erroneously read out for the following reason.

Assume now that in a facsimile transmitter, a document is placed on a flat table and the pattern region thereof is reduced in size and scanned by optical means, thereby to obtain a pattern signal. If, in this case, different facsimile transmitters of the same type are employed to work on the same document, the optical means scan the document inevitably at a different speed, however, finely they are adjusted. As a result, the scanning distance for a given time becomes longer or shorter by about 1 percent. This change of scanning distance causes a variation of the number of clock pulses which are counted during the period between the detection of the first reference mark 2 and the detection of the address mark 5. Consequently, the position of the address mark 5 cannot be detected correctly, and a wrong facsimile receiver is set to receive the information from the facsimile transmitter.

Further, a correct address designation is impossible if the document is placed slantwise on the flat table or contracts or expands due to a variation of the ambient humidity. If, for example, an A4-size document shrinks or expands by 1 to 2 percent of its original size, its pattern region becomes 2 to 4 mm shorter or longer. This makes it impossible to effect an accurate address designation in case the pattern region has as many as 70 to 80 address mark columns.

SUMMARY OF THE INVENTION

It is the object of this invention to provide a mark position detecting apparatus which correctly detects the position of a mark or marks written between two reference marks.

According to one embodiment of this invention, there is provided a mark position detecting apparatus comprising a signal generating circuit for producing a pattern signal corresponding to a pattern region including two reference marks, a mark region which has a plurality of mark columns of the same width and at least one mark written in one of the mark columns; first means for detecting the width of the mark region based on the pattern signal; second means for determining the width of each mark column by dividing the width of the mark region by the number of the mark columns in the mark region; and third means for detecting from the pattern signal the distance between one end of the mark region and the mark written between the first and second reference marks. The distance between one end of the mark region and the mark, which is detected by the third means, is divided by the mark column width or is compared with an integer multiple of the column width, thereby detecting the position of the mark between the first and second reference marks.

BRIEF DESCRIPTION OF THE DRAWING

FIG. 3 is a circuit diagram of one embodiment of the mark position detecting apparatus according to the present invention;

FIGS. 5 and 6 are each a circuit diagram of the arithmetic operation unit of the mark position detecting apparatus according to another embodiment of this invention.

DETAILED DESCRIPTION OF THE INVENTION

Figure 4A:
FIGS. 4A to 4H are time charts showing the operation of the mark position detecting circuit as illustrated in FIG. 3.

A solid state scanner 10 shown in FIG. 3 has a plurality of photo-electric converting elements which are arranged, for example, in a straight line. These photo-electric converting elements are excited one after another. Thus, the solid state scanner 10 scans a pattern region which is provided on an original document 1. The pattern region includes two reference marks and a plurality of address mark columns having the same width which are arranged between the reference marks. Upon scanning the pattern region, the solid state scanner 10 produces such a pattern signal as shown in FIG. 4A which corresponds to the pattern region. The pattern signal is supplied to one input terminal of an AND gate 11 and a mark edge detection circuit 12. From the AND gate 11 it is further supplied to the clear terminal of a counter 13 which is to detect the distance between the two reference marks. At the same time it is supplied to the clear terminal of a counter 14 which is to detect the address mark column width.

Figure 4B:
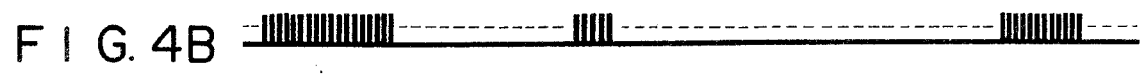

At its other input terminal the AND gate 11 receives such clock pulses as shown in FIG. 4B from a reference clock pulse generator 15. Thus, while receiving the high level portions of the pattern signal which correspond to the reference marks and the address mark, the AND gate 11 supplies the clock pulses to both counters 13 and 14 so that the counters 13 and 14 receive these clock pulses and count them. In this embodiment, the width of the reference marks is so determined that under normal condition 24 clock pulses will pass through the AND gate 11 while the solid state scanner 10 generates the high level portion of the pattern signal which corresponds to either reference mark 2 or 3. Similarly, the width of the address mark columns is so determined that under normal condition 8 clock pulses will pass through the AND gate 11 while the scanner 10 generates the high level portion of the pattern signal which corresponds to the address mark.

Figure 4C:
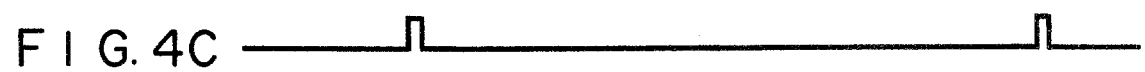

The counter 13 produces an output signal to the set terminal of a flip-flop circuit 16 when it counts 22 clock pulses from the AND gate 11. On the other hand, it supplies an output signal to the reset terminal of the flip-flop circuit 16 via an OR gate 17 when it counts 26 clock pulses from the AND gate 11. Thus, while the counter 13 is counting the 22nd to 26th clock pulses, the flip-flop 16 generates a high level signal. But if the counter 13 detects during this period the trailing edge of the reference mark signal, it is cleared and at the same time the flip-flop circuit 16 is reset as will be hereinafter described. Then, the flip-flop circuit 16 produces an output signal which assumes a low level when the counter 13 counts 22nd to 26th clock pulses as shown in FIG. 4C. This indicates that the width of the reference mark falls within the predetermined limits.

Figure 4D:

There is provided a mark edge detection circuit 12 which is constituted by an inverter circuit and a differential circuit for differentiating the pattern signal from the solid state scanner 10 so as to generate an output signal illustrated in FIG. 4D, which is supplied to AND gates 18, 19 and 20. At its other input terminal the AND gate 18 receives a signal from the output terminal Q of the flip-flop circuit 16. When receiving from the mark edge detection circuit 12 the differential signal corresponding to the trailing edge of the first reference mark while the counter 13 is counting 22nd to 26th clock pulses, the AND gate 18 supplies this differential signal to the reset terminal R of the flip-flop 16 via the OR gate 17, thereby resetting the flip-flop circuit 16. Simultaneously, the AND gate 18 supplies the differential signal to the set terminal S of a flip-flop circuit 21, the trigger terminal T of a monostable multivibrator 22 and one input terminal of an AND gate 23.

Figure 4E:
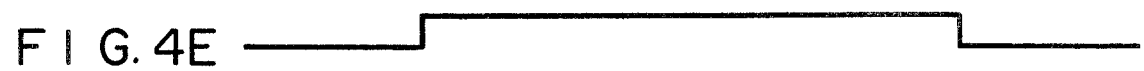

The flip-flop circuit 21 is thus set by the output signal from the AND gate 18, and remains in the same state until it is reset by an output signal from the output terminal Q of a flip-flop circuit 24 in such a manner as will be later explained. While being set, the flip-flop circuit 21 supplies such a set signal as shown in FIG. 4E to one input terminal of an AND gate 25. The other input terminal of the AND gate 25 is connected to the clock pulse generator 15. Thus, as long as the flip-flop circuit 21 is set, the AND gate 25 keeps supplying the clock pulses from the clock pulse generator 15 to an operation circuit 30, or more exactly to a presettable counter 31 which is to detect the length of the address mark region of the patern region, i.e. distance between the first and second reference marks.

Figure 4F:

The monostable multivibrator 22 is triggered by the output signal from the AND gate 18. It is so designed as to restore its original state upon elapse of a preset time after it is triggered, said preset time being a little shorter than the time which corresponds to the distance between the first and second reference mraks. As a result, as illustrated in FIG. 4F the output signal from the output terminal Q of the monostable multivibrator 22 reaches a high level when the trailing edge of the first reference mark is detected and then drops to a low level a little before the leading edge of the second reference mark is detected. In place of the monostable multibibrator 22 there may be employed a circuit constituted by a flip-flop circuit which is set by the differential signal from the mark edge detection circuit 12, and counter which starts counting clock pulses upon receipt of the differential signal and supplies a reset signal to the flip-flop circuit upon counting clock pulses the number of which corresponds to a distance a little shorter than that between the first and second reference marks. Thus, the distance between the first and second reference marks can be confirmed.

Figure 4G:

The AND gate 19 has three input terminals which are connected to the output terminal Q of the flip-flop circuit 21, the output terminal $\overline{Q}$ of the monostable multivibrator 22 and the mark edge detection circuit 12, respectively. If it receives a signal from the mark edge detection circuit 12 while receiving high level signals from the output terminal Q of the flip-flop circuit 21 and the output terminal $\overline{Q}$ of the monostable multivibrator 22, it supplies an output signal to the set terminal S of the flip-flop circuit 24. Namely, the AND gate 19 produces an output signal when it receives the differential signal corresponding to the leading edge of the second reference mark as well as the high level signals from the flip-flop ciruit 21 and the monostable multivibrator 22. Set by the output signal of the AND gate 19, the flip-flop circuit 24 supplies such an output signal as shown in FIG. 4G to the reset terminal R of the flip-flop circuit 21, thereby resetting the flip-flop circuit 21. At the same time, the output signal of the flip-flop circuit 24 is supplied also to the AND gate 23.

Like the first reference mark signal, the second reference mark signal is processed by the AND gate 11, counter 13, flip-flop circuit 16, mark edge detection circuit 12 and AND gate 18. The differential signal which is produced by the mark edge detection circuit 12 and which corresponds to the trailing edge of the second reference mark signal is supplied to the pulse generator 32 of the operation circuit 30 through the AND gate 23 already opened by the set ouput signal from the flip-flop circuit 24.

Figure 4H:

Like the counter 13, the counter 14 counts the clock pulse from the clock pulse generator 15 so long as the solid state scanner 10 keeps generating the reference mark signals or the address mark signal. Upon counting four clock pulses, it supplies an output signal to the set terminal S of a flip-flop circuit 26, thus setting the flip-flop circuit 26. Further, upon counting 12 clock pulses, the counter 14 supplies an output signal to the reset terminal R of the flip-flop circuit 26, thereby resetting the flip-flop circuit 26. As a result, the flip-flop circuit 26 produces such an output signal as shown in FIG. 4H. The output signal of the flip-flop circuit 26 is supplied to the AND gate 20. The AND gate has three input terminals which are connected to the output terminal of the mark edge detection circuit 12, the output terminal Q of the monostable multivibrator 22 and the output terminal Q of the flip-flop circuit 26, respectively. Consequently, as clearly understood from FIGS. 4D, 4F and 4H, only the differential signal corresponding to the trailing edge of the address mark signal passes through the AND gate 20 and is supplied to the set terminal S of an address mark position detecting register 33 in the operation circuit 30.

The presettable counter 31 of the operation circuit 30 starts counting clock pulses from the clock pulse generator 15 when the trailing edge of the first reference mark is detected and stops counting the same when the leading edge of the second reference mark is detected. Then, it stores the count and supplies a count output to the address mark position-detecting register 33 and to a divider 34 of the circuit 30. Since the register 33 is set by the output signal from the AND gate 20, it stores the count which corresponds to the distance between the first reference mark and the address mark. On the other hand, the presettable counter 31 stores the count which corresponds to the distance between the first and second reference marks when it finishes counting the clock pulses.

The operation circuit 30 is further provided with a pulse generator 32, a memory 35, a divisor register 36 and a counter 37. In the memory 35 the number of mark columns is stored already. The pulse generator 32 starts producing pulses one after another in response to the output signal of the AND gate 23. The pulses are supplied to the counter 37. Upon counting the first pulse from the pulse generator 32, the counter 37 supplies a set signal to the first set terminal S1 of the divisor register 36. When set by the first set signal, the divisor register 36 transfers the data representing the number of mark columns from the memory 35 to the divider 34. Upon counting the second pulse from the pulse generator 32, the counter 37 supplies a set signal to the second set terminal S2 of the divisor register 36. When set by the second set signal, the divisor register 36 stores the count data from the divider 34. At the same time the counter 37 supplies the set signal to the presettable counter 31. When set, the presettable counter 31 stores the contents of the address mark position detecting register 33.

Consequently, the divider 34 divides the count representing the distance between the first reference mark and the address mark by the count representing the mark width column, thereby generating a count signal which represents the position of the mark column containing the address mark. When the counter 37 counts the third pulse from the pulse generator 32, it supplies a reset signal to the flip-flop circuit 24, thus resetting the flip-flop circuit 24. Then, the output signal from the AND gate 23 drops to the low level, causing the pulse generator 32 to stop generating pulses.

FIG. 5 shows a modification of the operation circuit 30 illustrated in FIG. 3.

In FIG. 5, a counter 41 receives and counts the clock pulses from the AND gate 25 shown in FIG. 3 so as to detect the distance between the first and second reference marks. In this embodiment, 64 address mark columns are provided between the first and second reference marks, each column having a width of 3 mm and each address mark having a width of 1 mm. Thus, the address mark region is 192 mm long. For 1 mm scanning, in this example, the clock pulse generator 15 shown in FIG. 3 produces eight clock pulses. In theory, the counter 41 is to count 1536 clock pulses upon completion of scanning on the address mark region. In practice, however, it may fail to count exactly 1536 clock pulses.

In order to detect th distance between the first and second reference marks, the counter 41 has 11 binary output terminals. From these output terminals the output signals of the counter 41 are supplied to the input terminals A0 to A10 of an adder 43 and to the input terminals B0 to B10 of a register 42. Like the register 33 of the operation circuit 30 shown in FIG. 3, the register 42 is set by the differential signal which corresponds to the trailing edge of the address mark and which is supplied from the AND gate 20 shown in FIG. 3. Thus set, the register 42 stores the count which corresponds to the distance between the first reference mark and the address mark and then supplies this count to the input terminals C0 to C10 of a comparator 44.

Besides the input terminals A0 to A10, the adder 43 is provided with six input terminals A11 to A16. From its output terminals "$2^0$" to "$2^{16}$" corresponding to its input terminals A0 to A16 the adder 43 supplies the count output signal, which corresponds to the distance between the first and second reference marks, to the input terminals D0 to D16 of a register 45. At the same time, it supplies the count from its output terminals "$2^6$" to "$2^{16}$" to the input terminals E0 to E10 of the comparator 44.

Here it should be noted that the binary data which represents the length of the address mark region and which has been supplied to the input terminals A0 to A10 of the adder 43 can be divided by the number of mark columns or the count per mark column can be obtained merely by shifting the binary data in a lower order direction by six digits. This is because in this embodiment 64 ($=2^6$) mark columns are formed in the address mark region. Thus, the count data supplied to the input terminals E0 to E10 of the comparator 44 from the output terminals "$2^6$" to "$2^{16}$" of the adder 43, which correspond to the input terminals A6 to A16, represents an integer portion of a mark column width.

The register 45 supplies its count data from its output terminals corresponding to its input terminals D0 to D10 to the other input terminals F0 to F16 of the adder 43.

The operation circuit shown in FIG. 5 is further provided with a signal generator 46 and a counter 47 for counting the number of operations effected in the adder 43. When the signal generator 46 receives at its input terminal T a trigger signal from the AND gate 23 shown in FIG. 3, it supplies a pulse of a predetermined frequency to the adder 43 as an addition instruction signal, to the register 45 as a set signal, and to the counter 47 as a clock pulse.

In response to every addition instruction signal from the signal generator 46, the adder 43 adds the input data to its input terminals A0 to A16 and the input data to its input terminals F0 to F16. Upon adding these data it supplies an output data to the comparator 44. Then, the comprator 44 compares the count data of the adder 43 with that of the register 42. If the count data of the adder 43 is found to be greater, the comparator 44 supplies an output signal to an AND gate 48. The AND gate 48 produces an end-of-addition signal when it receives the output signal of the comparator 44 at its one input terminal and the signal from the signal generator 47 at its other input terminal. The end-of-addition signal resets the signal generator 46. Further, it serves as a dialing start instruction signal which couples an address mark code signal from the counter 47 to, for example, a dialing circuit (not shown).

Thus, the signal generator 46 starts generating signals when triggered by the output signal of the AND gate 23 and stops generating signals when cleared by the output signal of the AND gate 48. The signals generated by the signal generator 46 are counted by the counter 47, from which there is obtained an address mark code signal which represents the position of the address mark.

Suppose an address mark is written in the fifth address mark column. Then, the AND gate 20 supplies a set signal to the set terminal S of the register 42 when the counter 41 counts 96 to 120 clock pulses, for example 115 clock pulses. This is because 24 clock pulses are generated for each address mark column since, as mentioned above, the clock pulse generator 15 produces 1536 clock pulses for the 64 address mark columns. When set by the set signal from the AND gate 20, the register 42 stores count "115". The counter 41 keeps counting clock pulses and when it finishes counting clock pulses, its count reaches a value of about 1536.

As mentioned above, when triggered by an output signal of the AND gate 23, the signal generator 46 supplies a first pulse to both the adder 43 and the register 45. In response to the first pulse, i.e. addition instruction signal, the adder 43 supplies the binary count data which corresponds to count "1536" from its output terminals "$2^0$" to "$2^{16}$" to the register 45. Simultaneously, it supplies from its output terminals "$2^6$" to "$2^{16}$" to the comparator 44 the binary count data which corresponds to count "24". In the meantime, the register 45 is set by the first pulse, i.e. set signal, and stores the binary count data from the adder 43 which corresponds to count "1536". The comparator 44 compares the count data from the adder 43 with the count data from the register 42. Since the count of the adder is "24" (=1536/64) while that of the register 42 is "115", the comparator 44 produces no output signal.

Then, the signal generator 46 supplies a second pulse. At this time the adder 43 is supplied through its input terminals F0 to F16 with the count data from the register 45 which corresponds to count "1536". As a result, in response to the second pulse the adder 43 supplies from its output terminals "$2^0$" to "$2^{16}$" to the register 45 the binary count data which corresponds to count "3072", i.e. sum of count "1536" from the register 45 and count "1536" supplied to its input terminals A0 to A16. At the same time it supplies from its output terminals "$2^6$" to "$2^{16}$" to the comparator 44 the binary count data which corresponds to count 48 (=3072/64). The register 45 is set by the second pulse from the signal generator 46, thereby storing the binary count data from the adder 43 which corresponds to count "3072".

The comparator 44 compares the count data from the adder 43 with the count data from the register 42. Since the former is "48" and smaller than the latter, i.e. "115", the comparator 44 does not produce an output signal yet.

Similar count data comparison is repeated every time the signal generator 46 produces a pulse. When the signal generator 46 produces a fifth pulse, the count data supplied from the register 45 to the input terminals F0 to F16 of the adder 43 corresponds to count "6144". Thus, the count data corresponding to count "7680" are supplied from the output terminals "$2^0$" to "$2^{16}$" of the adder 43 to the register 45. Simultaneously, count data corresponding to count "120" (=7680/64) is supplied from the output terminals "$2^6$" to "$2^{16}$" of the adder 43 to the comparator 44. In this case, the count data from the adder 43 is greater than that from the register 42. As a result, the comparator 44 produces an output signal, which is supplied to the clear terminal of the signal generator 46 through the AND gate 48. Upon receipt of this output signal from the comparator 44, the signal generator 46 stops its operation and then the counter 41, registers 42 and 45 and counter 47 are cleared by a suitable clear signal generator (not shown).

In this example, the signal generator 46 produces five pulses from after it is triggered by the AND gate 23 until it is reset by the AND gate 48. The counter 47 therefore receives five pulses from the signal generator 46. For this reason, the counter 47 generates an address code signal which indicates that an address mark is written in the fifth address mark column.

If the scanning speed of the solid state scanner 10 is changed due to a fine adjustment of the optical system between the original document 1 and the scanner 10, the detected length of the address mark region inevitably varies. The same would occur if the original document 1 is placed slantwise to the scanning direction or contracts or expands due to a change of the ambient humidity. But, the address mark column width which is computed based on the detected length of the address mark region does also change in proportion to such variation in the detected length of the address mark region.

Thus in the embodiment of FIG. 3, for example, the variation of the detected length of the address mark region can be cancelled out merely by dividing the detected length of the region by the address mark column width, thereby detecting accurately the position of an address mark. It often happens that this division results in a remainder. But the remainder can be discarded without affecting the correct detection of the position of an address mark since the clock pulse generator 15 produces, as mentioned above, clock pulses of so high a frequency wave that a sufficient number of clock puses are allotted to each address mark column. The same holds true of the embodiment of FIG. 5. Thus the embodiment of FIG. 5 detects the position of an address mark accurately, too, no matter whether the orginal document 1 has its size changed or is placed slantwise to the scanning direction.

The aforementioned embodiments of this invention are concerned with facsimile transmission. But the invention is not necessarily limited to facsimile transmission. The mark position detecting apparatus according to this invention may be used as, for example, an optical mark reader for data processing. In the second embodiment shown in FIG. 5, the counter 41 for processing the count "1536" has 11 output terminals "$2^0$" to "$2^{10}$". Instead it may have more or less output terminals according to the amount of data to be processed. Then, according to the change in number of the output terminals of the counter 41, the registers 42, 45, adder 43 etc. may be designed to have a larger or smaller data processing capacity.

Further, the mark position detecting apparatus according to this invention may obtain the distance between an address mark and the second reference mark, instead of the distance between the first reference mark and an address mark, thereby to detect the position of the address mark. It is also possible that the side edges of the original document 1 may be used in place of the first and second reference marks. It is further possible to detect the positions of two or more address marks which are written in respective address mark columns. In this case the embodiment of FIG. 5 is more advantageous than the embodiment of FIG. 3.

Figure 1:
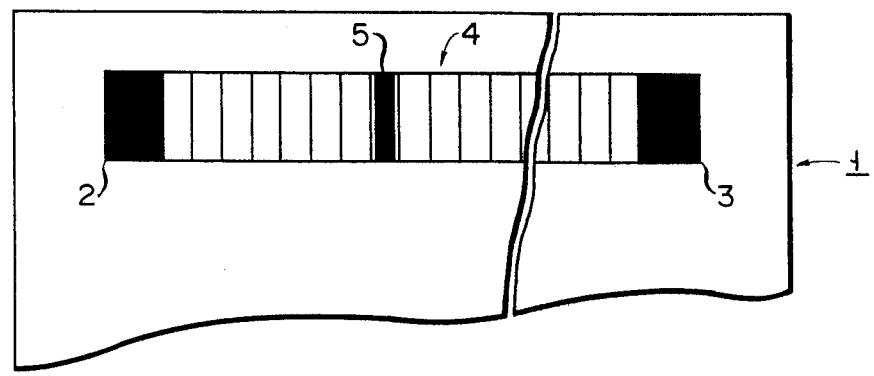
FIG. 1 shows an example of a pattern region which is used in the facsimile transmission to designate the address or addresses to which documents are to be transmitted.
Figure 6:
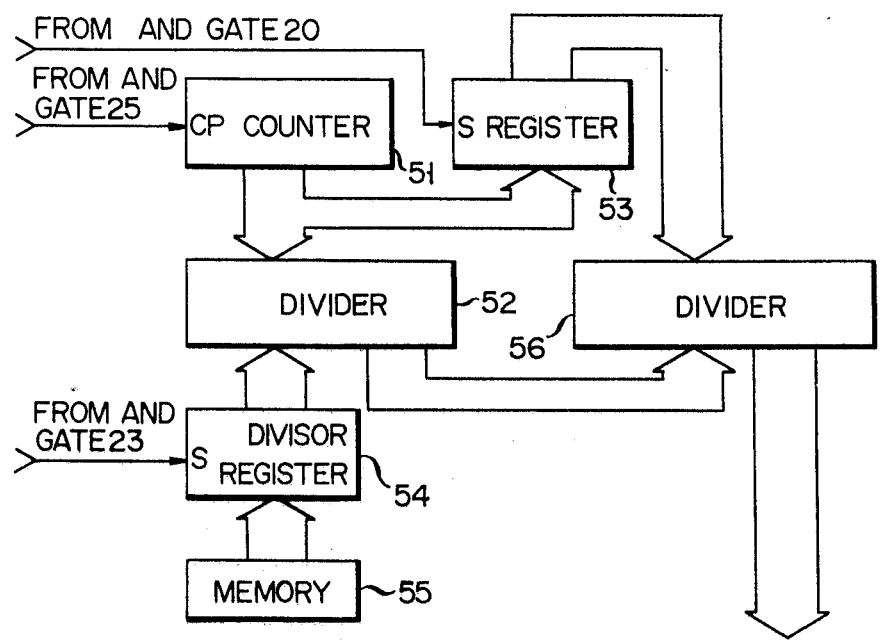
Figure 2A:
FIGS. 2A to 2C are time charts explaining the operation principles of the conventional address recognition apparatus.
Figure 2B:
Figure 2C:

Still further, as shown in FIG. 6, two dividers 52 and 56 may be provided each to effect a division once in order to detect the position of one address mark, instead of a single divider 36 shown in FIG. 3 which effects a division twice in order to detect the position of one address mark. In addition, the pattern region of the original document 1 may be scanned not only once but many times so that based on a plurality of pattern signals the position of an address mark (or address marks) is detected more correctly.

In the embodiment of FIG. 6, like the presettable counter 31 shown in FIG. 3, a counter 51 counts clock pulses the number of which corresponds to the distance btween the first and second reference marks. It supplies its count to a first divider 52 and a register 53. Like the register 33 shown in FIG. 3, the register 53 is set by an output signal from the AND gate 20 and stores the count data which corresponds to the distance between the first reference mark and an address mark. There are further provided a divisor register 54 and a memory 55. In the memory 55 the number of address mark columns is stored. Upon receipt of an output signal from the AND gate 23 the divisor register 54 is set to store the contents of the memory 55. Then, the divisor register 54 supplies to a divider 52 a data which represents the number of address mark columns. Upon receipt of the information the divider 52 divides the count data from the counter 51 by the number of address mark columns to obtain count data which corresponds to the address mark column width. The count data thus obtained is supplied to another divider 56. As a result, the divider 56 divides the count data from the register 53 by the count data from the divider 52, thus producing data which indicates the position of the address mark column having the address mark written therein.

What is claimed is:

1. A mark position detecting apparatus comprising a pattern signal generating circuit for producing a pattern signal corresponding to a pattern region upon scanning of the pattern region which includes first and second reference marks and a mark region arranged between the first and second reference marks and divided into a plurality of mark columns having the same width at least one of which contains a mark; first means for detecting the length of the mark region from the pattern signal; second means for detecting the distance between one end of the mark region to the mark; and the third means for dividing the count data from said first means which represents the length of the mark region by the number of the mark columns thereby to generate a count data which represents the mark column width and for dividing the count data from said second means which represents the distance between said end of the mark region and the mark by the count data which represents the mark column width thereby to generate a count data which represents the position of the mark column containing the mark.

2. A mark position detecting apparatus according to claim 1, wherein said second means includes a mark detection circuit for detecting said mark from the pattern signal and a first register for storing in response to an output signal from said mark detection circuit the count data which is generated from said first means at the time when said mark detection circuit detects said mark, and said third means includes a count data generating circuit for generating a count data which represents the number of mark columns and a divider circuit for dividing the count data from said first means which represents the length of the mark region by the count data from said count data generating circuit thereby to generate a count data which represents the mark column width and for dividing the count data from said first register by the count data which represents the mark column width.

3. A mark position detecting apparatus according to claim 2, wherein said third means includes a control signal generating circuit for generating first and second control signals, said divider circuit includes a divider and a second register for storing the count data from said count data generating circuit in response to the first control signal from said control signal generating circuit and then supplying the stored count data to said divider which in turn generates a count data representing the mark column width and for storing in response to the second control signal the count data representing the mark column width and supplying the stored count data to said divider, and said first means includes a presettable counter for receiving the count data from said first register in response to the second control signal from said control signal generating circuit and supplying the received count data to said divider.

4. A mark position detecting apparatus according to claim 3 further including a control circuit for detecting the width of said first and second reference marks, said control circuit supplying a third control signal to set said presettable counter when the first-scanned reference mark is found to have a width which falls within predetermined limits and supplying a fourth control signal to set said control signal generating circuit when both reference marks are found to have a width which falls within predetermined limits.

5. A mark position detecting apparatus comprising a pattern signal generating circuit for producing a pattern signal corresponding to a pattern region upon scanning of the pattern region which includes first and second reference marks and a mark region arranged between the first and second reference marks and divided into a plurality of mark columns having the same width at least one of which contains a mark; first means for detecting the length of the mark region from the pattern signal; second means for detecting the distance between one end of the mark region and the mark; third means for generating a count data which respresents the number of mark columns; fourth means for dividing the count data from said first means which represents the length of the mark region by the count data from said third means which represents the number of mark columns thereby to generate a count data which represents the mark column width; and fifth means for dividing the count data from said second means which represents the distance between said one end of the mark region and said mark by the count data from said fourth means which represents the mark column width thereby to generate a count data which represents the position of the mark column containing said mark.

6. A mark position detecting apparatus according to claim 5, wherein there is further provided sixth means for detecting the width of said first and second reference marks, said sixth means supplying a first control signal to set said first means when the first-scanned reference mark is found to have a width which falls within predetermined limits and generating a second control signal when both reference marks are found to have a width which falls within predetermined limits; and said third means includes a memory for storing the number of mark columns and a register for storing the count data from said memory which represents the number of mark column and supplying the stored count data to said fourth means when set by the second signal from said sixth means.

7. A mark position detecting apparatus comprising a pattern signal generating circuit for producing a pattern signal corresponding to a pattern region upon scanning of the pattern region which includes first and second reference marks and a mark region arranged between the first and second reference marks and divided into a plurality of mark columns having the same width at least one of which contains a mark; first means for detecting the length of the mark region from the pattern signal; second means for detecting the distance between one end of the mark region and the mark; third means for temporarily storing an input count data; a control signal generating circuit for generating a series of control signals; fourth means for adding the count data from said first and that from said third means upon receipt of every control signal from said control signal generating circuit thereby to supply to said third means a count data which is the sum of these count data; fifth means for dividing the count data from said fourth means by the number of mark columns to generate a count data representing an integer multiple of the mark column width; sixth means for comparing the count data from said second means with the count data from said fifth means, said sixth means supplying an output signal to set said control signal generating circuit when the count data from the fifth means is found to be greater than that from the second means; and seventh means coupled to said control signal generating circuit for detecting the number of additions carried out by said fourth means until said sixth means generates an output signal, thereby to generate a signal which represents the position of the mark column containing the mark.

8. A mark position detecting apparatus according to claim 7, wherein said first means includes a binary counter to detect the length of a mark region having $2^n$ mark columns, where $n$ denotes an integer; said second means includes a circuit for detecting said mark from the pattern signal and a first register for storing the current count data of said binary counter in response to an output signal from said circuit; said third means includes a second register; and said fourth and fifth means include an adder for adding the count data from said binary counter and that from said second register in response to a series of control signals from said control signal generating circuit thereby to supply the sum of these count data to said second register and for shifting the sum count data in a lower order direction by $n$ digits to supply the shifted count data to said sixth means.

9. A mark position detecting apparatus according to claim 8 further including a control circuit for detecting the width of said first and second reference marks, said control circuit supplying a first control signal to set said binary counter when the first-scanned reference mark is found to have a width which falls within predetermined limits and supplying a second control signal to set said control signal generating circuit when both reference marks are found to have a width which falls within said predetermined limits.

* * * * *